United States Patent
Thurm

[11] Patent Number: 5,749,591
[45] Date of Patent: May 12, 1998

[54] MOTORCYCLE LEAF SPRING SUSPENSION SYSTEM

[76] Inventor: Kenneth R. Thurm, 2348 Rockridge Cir., Orange, Calif. 92667

[21] Appl. No.: 516,499

[22] Filed: Aug. 17, 1995

[51] Int. Cl.⁶ .................................................. B62K 25/00
[52] U.S. Cl. .......................................... 280/284; 180/227
[58] Field of Search .................................. 280/284, 285, 280/283, 286; 180/227; 267/271

[56] References Cited

U.S. PATENT DOCUMENTS

| | | | |
|---|---|---|---|
| 709,718 | 9/1902 | Monahan . | |
| 1,029,771 | 6/1912 | Stephenson . | |
| 1,047,431 | 12/1912 | Michaelson | 280/284 |
| 1,101,764 | 7/1914 | Stephenson | 280/284 |
| 1,154,821 | 9/1915 | Whiting . | |
| 1,257,761 | 2/1918 | Strand | 280/284 |
| 1,261,440 | 4/1918 | Rigby . | |
| 1,306,995 | 6/1919 | Bradshaw . | |
| 3,982,770 | 9/1976 | Satoh et al. | 280/284 |
| 4,583,612 | 4/1986 | Parker . | |
| 4,732,404 | 3/1988 | Coetzee . | |
| 4,765,431 | 8/1988 | Yoshioka | 180/227 |
| 4,972,920 | 11/1990 | Zamitter et al. . | |
| 5,279,383 | 6/1994 | Gustafsson . | |
| 5,441,292 | 8/1995 | Busby | 280/284 |
| 5,487,443 | 1/1996 | Thurm | 180/227 |

FOREIGN PATENT DOCUMENTS

| | | | |
|---|---|---|---|
| 438288 | 2/1992 | Japan . | |
| 5330476 | 12/1993 | Japan | 180/227 |
| 153762 | 10/1919 | United Kingdom | 280/284 |
| 2038736 | 7/1980 | United Kingdom | 280/284 |
| 2109320 | 6/1983 | United Kingdom . | |

Primary Examiner—Brian L. Johnson
Assistant Examiner—Gary Savitt
Attorney, Agent, or Firm—Knobbe, Martens, Olson & Bear, LLP

[57] ABSTRACT

A motorcycle rear wheel frame is pivotally mounted to the motorcycle main frame. A shaft is positioned on a pivot axis of the rear wheel frame and the main frame of the motorcycle. Rigidly attached to the shaft is one end of a leaf spring. The other end of the leaf spring contacts a transverse cross member of the swing arm so that pivotal movement of said rear frame with respect to the main frame is primarily absorbed by the leaf spring.

5 Claims, 8 Drawing Sheets

MOTORCYCLE LEAF SPRING SUSPENSION SYSTEM

FIELD OF THE INVENTION

The present invention relates in general to a motorcycle and, more particularly, to a motorcycle suspension system.

BACKGROUND INFORMATION

A motorcycle generally consists of a main frame that supports most of the major components of the motorcycle and a rear frame that rotatably supports the rear wheel of the motorcycle. The rear frame is also commonly called a rear fork or swing arm. The swing arm is typically attached to the main frame of the motorcycle by a suspension system. The suspension system permits independent vertical movement of the swing arm relative to the main frame. This independent movement allows the rear wheel to respond to road fluctuations and variances in terrain. The suspension system also prevents or decreases forces caused by bumps and jolts in the road from being transmitted to the main frame and rider. This improves the handling quality and riding comfort of the motorcycle.

The swing arm of a motorcycle commonly consists of a wheel attachment point or wheel mount located on each side of a rear wheel. The axle of the rear wheel is typically connected to the wheel mounts such that the wheel rotates about a wheel axis. An arm is typically attached to each wheel mount and these arms are attached to the main frame by a suspension system in a manner that allows the arms and rear wheel to move relative to the main frame of the motorcycle. A typical suspension system includes many components such as arms, links, shock absorbers, springs, and/or torsion bars. These components are usually positioned between the arms and the main frame to permit the movement of the wheel relative to the main frame.

As discussed in Applicant's co-pending U.S. patent application Ser. No. 08/183,604, which discloses a motorcycle torsion suspension system, spring suspension systems for motorcycles are known. These known spring suspension systems, however, require a plurality of parts and are difficult to manufacture and install. Thus, a suspension system without these disadvantages is desired.

A motorcycle utilizing a leaf spring suspension system is also known. For example, U.S. Pat. No. 5,279,383 issued to Gustafsson and assigned to Ohlins Racing AB of Sweden discloses a leaf spring suspension characterized by an elongated composite spring which has one end of the spring mounted to the lower front part of the main frame of the motorcycle. The other end of the spring is loaded by a link member which transmits force from the rear fork to the spring. The frame is provided on its underside with at least one deflecting member which is arranged in such a manner that it bears against the composite spring upon a relatively low loading of the rear fork relative to the frame to change the spring rate. This device requires, disadvantageously, an elongated composite spring that extends the length of the main frame, a bearing surface that engages the spring, and a plurality of interconnected and exposed parts to form the suspension system.

There remains a need for a leaf spring suspension system which is simple, easy to manufacture and install, and does not require a plurality of parts.

In addition, it is often highly desirable to have a suspension system that is substantially invisible from a side view of the motorcycle. For example, the Harley-Davidson Company of Milwaukee, Wis., is a well-known motorcycle manufacturer that constructs a very popular type of suspension system known as the Harley-Davidson Softail suspension system. The Softail suspension system generally has no suspension components exposed in a side view of the motorcycle, and it is particularly designed to have the appearance of a Harley-Davidson "hard tail" frame. The "hard tail" frame consists of a wheel mount located on each side of the rear wheel with a pair of angularly extending arms joined to each wheel mount. A rear axle is attached between the wheel mounts to rotatably attach the rear wheel about a wheel axis. The other ends of the arms are connected directly to the frame struts of the motorcycle main frame. Thus, there is virtually no suspension system to absorb deflection of the rear wheel and the movement of the rear wheel caused by hitting bumps in the road is transmitted to the main frame and the rider. This severely impairs the riding and handling qualities of the motorcycle.

The Harley-Davidson Softail suspension system attempts to duplicate the appearance of the "hard tail" frame while improving the riding quality and comfort of the motorcycle by incorporating a suspension system. Instead of connecting the pair of arms extending from each wheel mount directly to the frame strut of the main frame, each pair of arms is attached to an elongated connector which has the same general shape as the frame strut. Each connector is positioned adjacent and inside the corresponding frame strut of the main frame so that the connectors are substantially hidden in a side view of the motorcycle. The connectors are pivotally attached to the frame struts along a pivot axis which is located proximate the center of the connectors. A bolt extends along the pivot axis and connects the connectors to the frame struts such that the swing arm can pivot relative to the main frame.

In further detail, the pair of angularly extending arms from each wheel mount are attached proximate the opposing ends of the respective elongated connector. The ends of the connectors are attached to each other by upper and lower transverse cross members. The transverse cross members are typically constructed of tubular steel and the cross members are generally parallel to the wheel axis. The Softail suspension system does not alter the aesthetics of the "hard tail" frame because the connectors and transverse cross members are generally hidden from view by the main frame of the motorcycle.

The Softail suspension system utilizes two shock absorbers mounted parallel to the bottom of the motorcycle main frame to control the movement of the swing arm relative to the main frame. In particular, the shock absorbers are mounted generally horizontally with one end attached toward the forward portion of the main frame and the other end of the shock absorber connected to a projection extending forwardly from the lower transverse cross member of the swing arm. The projection is adapted to receive a bolt or pin which connects the shock absorbers to the projection. The main frame of the motorcycle generally hides the projection and shock absorbers from view Therefore, this arrangement of the Softail suspension system preserves the highly desirable appearance of a Harley-Davidson "hard tail" frame.

The Softail suspension system is advantageous over the "hard tail" frame because it provides a suspension system that improves the handling and riding comfort of the motorcycle. FIG. 1 shows a portion of a motorcycle 10 with a Harley-Davidson Softail suspension system 12. The Softail suspension system 12 includes a swing arm 14 pivotally connected to a main-frame 16 of the motorcycle 10 about a pivot axis A—A. The swing arm 14 is connected to a shock absorber 18 (only one of the two is shown) by a plate 20 forwardly extending from a lower transverse cross member (not shown) of the swing arm 14. The lower transverse cross member is hidden from view by a frame strut 22 of the motorcycle main frame 16. In a manner well known in the art, a rear wheel (not shown) of the motorcycle 10 is attached to wheel mounts 24a and 24b about a wheel axis B—B. As indicated in FIG. 1, the rear wheel can move up and down (commonly referred to as wheel travel) a total distance X, which is approximately 4 inches. The movement of the rear wheel and swing arm 14 extends and retracts the shock absorber 18 mounted proximate the lower portion of the main frame 16 of the motorcycle 10.

The effective travel distance of the suspension system, however, is only about 2 inches because the full 4 inches of wheel travel is only available when there is no load on the suspension system. As known in the art, the suspension system must support the static weight of the motorcycle and rider. This loading of the suspension system before the motorcycle is moved is generally known as preloading of the suspension system and this preloading uses about half the four inch total distance of wheel travel. Therefore, the preloading of the suspension system causes the rear wheel to be generally centered within its range of motion such that the rear wheel can only travel a maximum of about 2 inches in either the upward and downward directions.

The travel distance of the shock absorber, however, is much less than the travel distance of the rear wheel. The effective travel distance of the shock absorber is only about 1½ inches, or about ¾ of an inch in either direction from the center position because of the geometry of the suspension system. As described above, the shock absorber 18 is attached to the lower portion of the swing arm 14 by the forwardly extending plate 20. The distance between the connection of the shock absorber 18 to the plate 20 and the pivot axis A—A of the swing arm 14 is about 5 inches, and the attachment point is about ½ inch forward of the pivot axis A—A. In contrast, the distance from the wheel axis B—B to the pivot axis A—A is about 16 inches and the wheel axis B—B and pivot axis A—A are generally horizontally aligned. Thus, the attachment of the shock absorber 18 to the swing arm 14 is much closer to the pivot axis A—A than the wheel axis B—B. This geometry of the suspension system results in a shock absorber movement of approximately 38 percent of the wheel travel, or a ratio of about 2.6:1. That is, for every inch that the rear wheel moves up or down, the corresponding movement of the shock absorber is only about ⅜ of an inch. Accordingly, for 2 inches of wheel travel in either upward or downward directions, the shock absorber can only move about ¾ of an inch.

As a result, the Softail suspension system has significant disadvantages because the damping and energy absorption of the shock absorber must occur within this ¾ of an inch of travel. If the suspension system does not absorb the energy before the shock absorber reaches the end of its travel, the suspension system "bottoms out." This can be very dangerous and may cause the rider to lose control of the motorcycle. Accordingly, the shock absorber of the motorcycle must be very stiff to prevent bottoming out and this causes a very harsh and uncomfortable ride.

The limited distance of shock absorber travel results in a harsh ride because the suspension system must support the weight of the motorcycle, about 700 pounds, along with the weight of the rider and other equipment. Thus, the suspension system often supports a static weight over 1,000 pounds. During operation of the motorcycle, the suspension system must react to the impact of the motorcycle hitting bumps or other obstructions in the road. Specifically, as the leading edge of the rear tire contacts the bump, the tire compresses, and the tire transfers the force of the impact to the wheel which moves upward (regardless of bump size, the wheel can only move upward within a range of about 2 inches). The upward movement of the rear wheel causes the swing arm to rotate about its pivot axis. The rotating swing arm pulls on the shock absorber, often with a large amount of force, and the shock absorber must prevent the suspension system from bottoming out. It will be appreciated that a motorcycle weighing about 1,000 pounds and hitting a bump at approximately 60 miles per hour generates a tremendous amount of force on the suspension system. In order to resist this force, the shock absorber must be equipped with very strong, resistant springs or other damping mechanisms because it has only about ¾ of an inch in which to arrest that force.

Additionally, the short distance of travel mandates continual and rapid changes of the force on the shock absorber according to the varying movement of the wheel. These directional changes, however, are delayed because of the inherent reluctance of the shock absorber to rapidly change directions. For example, shock absorbers have a delayed response because of intrinsic parasitic and inertial drag caused by the movement of the oil or gas within the shock absorber, friction and "sticktion" caused by the seals and O-rings, and relatively large momentum forces. Thus, the delayed response of the shock absorbers and limited effective suspension travel distance of the Harley-Davidson Softail suspension system results in an inadequate suspension system.

There have been previous attempts to improve the Softail suspension system. For example, the travel distance of the shock absorbers have been slightly increased. However, this solution offers only a modest improvement because the rotation of the swing arm about the pivot axis is limited by the swing arm contacting the main frame of the motorcycle. Any further increases in the shock absorber travel require modifications to the motorcycle main frame, which is very undesirable. Additionally, attempts have been made to improve the responsiveness of the shock absorbers, however, these attempts are hindered by the drag, friction forces, and limited travel distances discussed above.

Therefore, there remains a need for a suspension system that is substantially not visible from a side view of the motorcycle and does not have the above-described significant disadvantages.

SUMMARY OF THE INVENTION

In order to overcome the above-stated problems and limitations, a motorcycle suspension system is provided with a leaf spring for shock absorption. The suspension system includes a rear frame or swing arm having a wheel mount located on each side of the rear wheel. One end of a pair of arms is mounted to each wheel mount, and the other end of the pair of arms is joined to two elongated connectors, respectively. These connectors are joined by upper and lower transverse cross members to form the swing arm. The connectors are pivotally mounted along a pivot axis proximate the center of the frame struts of the motorcycle main frame so that the connectors are generally adjacent and parallel to the frame struts.

In a preferred embodiment, the elongated connectors and the frame struts of the suspension system are pivotally connected by a shaft extending along the pivot axis. As described above, the swing arm of the Harley-Davidson Softail suspension system pivots about a bolt located along the pivot axis. The bolt of the Softail suspension system is replaced by the shaft of the present invention. Attached to the shaft is one end of a leaf spring and the other end of the leaf spring engages the swing arm. The upward movement of the swing arm caused by movement of the wheel imparts a force on the leaf spring and the leaf spring flexes or bends to absorb the force and dampen the movement of the swing arm. When the force is removed, the leaf spring returns the swing arm to its previous position.

Advantageously, the leaf spring is hidden in a side view of the motorcycle by the frame struts and the elongated connectors so that the present invention does not alter the aesthetics of the suspension system. Additionally, as the rear wheel moves upward and the swing arm rotates about the pivot axis, the transverse cross member moves the same distance as the wheel travel and the ratio of wheel travel to suspension travel is about 1:1, rather than the compromising 2.6:1 ratio of the Softail suspension system. Significantly, because the leaf spring has a greater distance of travel than the shock absorber of a typical Softail suspension system, this results in a smoother and more compliant ride.

In addition, the present invention eliminates the need for shock absorbers, which are required in the Harley-Davidson Softail suspension system, because the leaf spring controls the movement of the swing arm. The leaf spring suspension system is advantageous because it does not have the above-described deficiencies, such as the inherent drag and friction forces of a shock absorber. Additionally, unlike conventional shock absorbers, the leaf spring does not have to be periodically replaced because the leaf spring does not wear out. Shock absorbers may, however, be used in addition to the leaf spring suspension system in order to further control the movement of the swing arm.

Preferably, a leaf spring is selected that allows the swing arm to rotate at least 14 degrees with respect to the main frame because the wheel axis can deflect a maximum of 14 degrees relative to the pivot axis. More preferably, a leaf spring that permits up to 22 degrees of rotation is selected.

The leaf spring of the present invention is preferably a cantilevered leaf spring, or more preferably a quarter leaf spring. Most preferably, the leaf spring has a contact line between the leaf spring and the transverse cross member of the swing arm that remains generally the same throughout the travel distance of the swing arm. This significantly reduces wear of the suspension system because there is no friction or relative movement between the leaf spring and the cross member.

In another preferred embodiment, the leaf spring includes multiple leaf springs. The multiple leaf springs allow the suspension characteristics and movement of the swing arm relative to the main frame to be varied. For example, leaf springs of different lengths may be used to progressively vary the characteristics of the suspension system.

As previously indicated, the shock absorbers required in a Harley-Davidson Softail suspension system have a maximum travel of 1½ inches or ¾ of an inch in either direction from a centered position. This causes an uncomfortable ride because the shock absorbers must absorb large forces from hitting bumps and must continually and rapidly change directions within a very limited range of motion. Further, the shock absorbers have a delayed response because they are intrinsically limited by factors such as friction and drag. In contrast, the leaf spring of the present invention offers significant advantages of a 1:1 ratio of wheel travel to suspension travel with minimal drag and other delay forces. This allows the suspension system of the present invention to react quicker, which creates a softer, more controlled, and superior suspension system.

The present invention provides a simple, light weight means of improving a motorcycle suspension system. The present invention is inexpensive to manufacture, efficient in operation, and generally has no visible suspension components to maintain the highly desirable appearance of a Harley Davidson "hard tail" frame. Further, the present invention can be sold as a kit to modify existing suspension systems. The invention is a simple modification that is particularly adapted to Harley-Davidson Softail suspension system, but it can be fitted to other motorcycle suspension systems.

The foregoing and other objects and features of the present invention will become more fully apparent from the following description and appended claims, taken in conjunction with the accompanying drawings. Understanding that these drawings-depict only typical embodiments of the invention and are, therefore, not to be considered limiting of its scope, the invention will be described with additional specificity and detail through use of accompanying drawings which:

DETAILED DESCRIPTION OF THE PREFERRED EMBODIMENT

Figure 1:
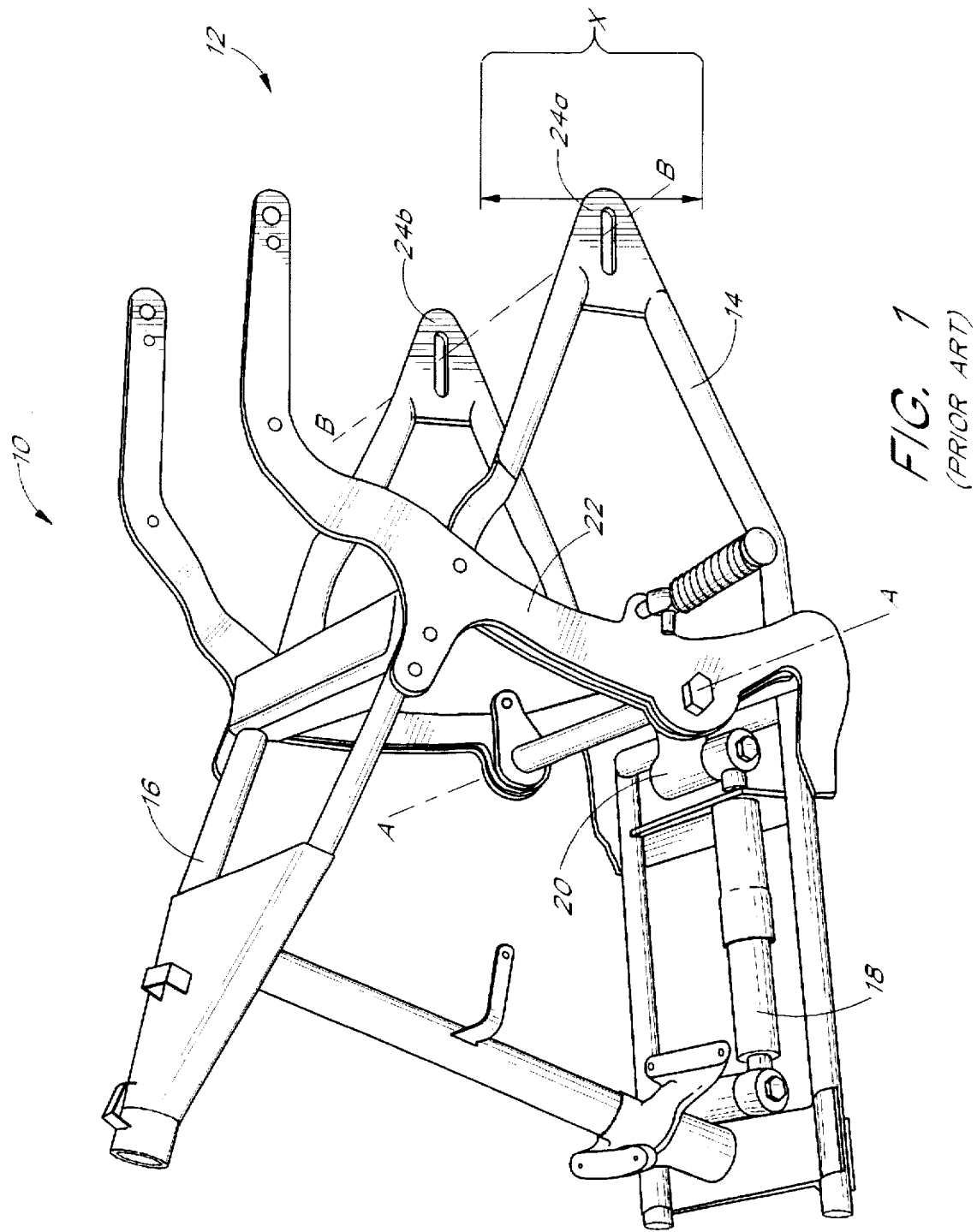
FIG. 1 is a side perspective view of a Harley-Davidson Softail suspension system.
Figure 2:
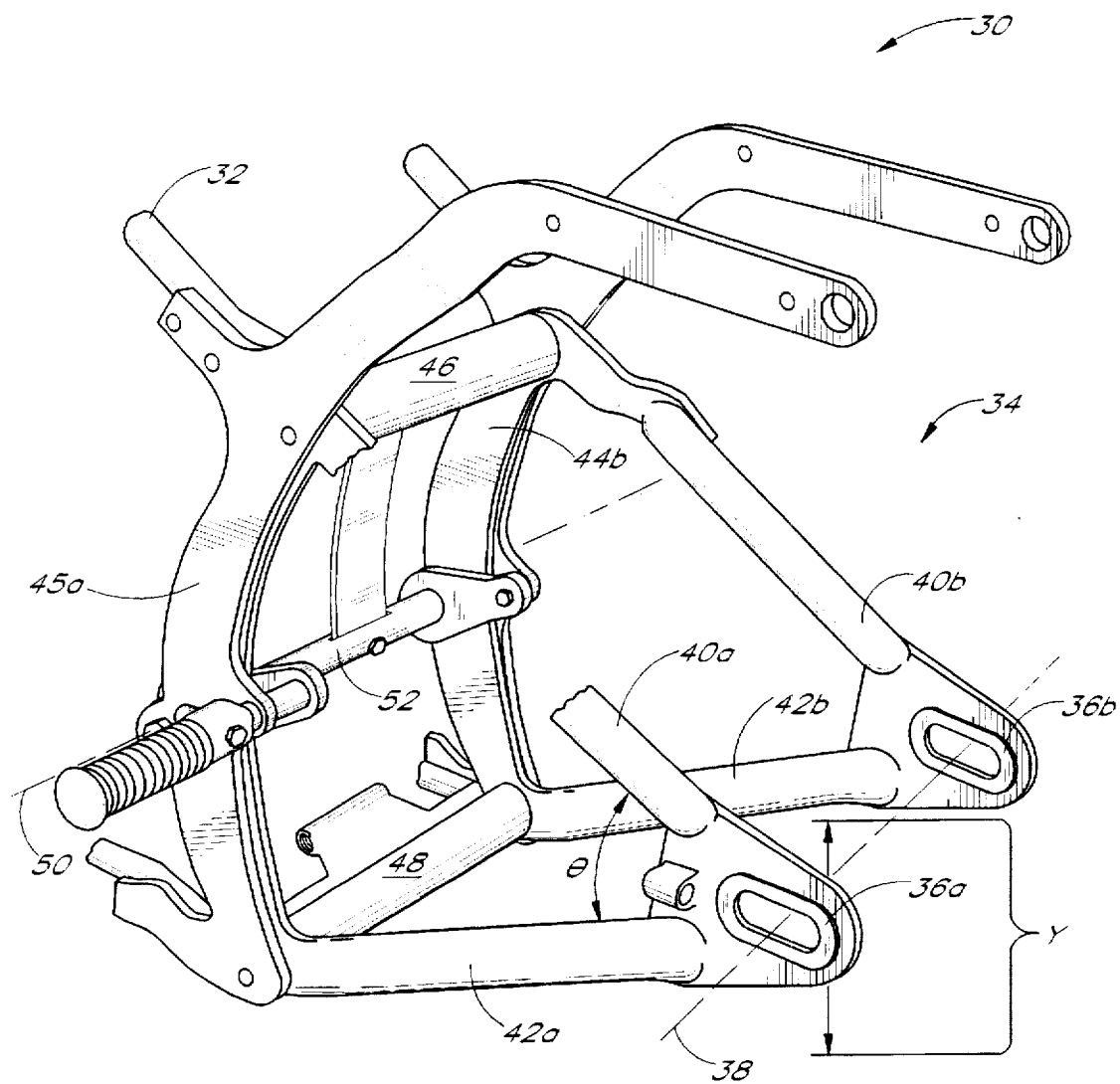
FIG. 2 is an end cut-away perspective view of a preferred embodiment of the present invention of a motorcycle suspension system.

As shown in FIG. 2, a motorcycle suspension system 30 includes a main frame 32 and a rear frame or swing arm 34. The swing arm 34 includes wheel mounts 36a and 36b. Attached to the wheel mounts 36a and 36b, about a wheel axis 38, is a wheel (not shown) as is well known in the art. Extending from each wheel mount 36a and 36b are upper arms 40a and 40b and lower arms 42a and 42b, respectively. These arms are arranged in side-by-side parallel pairs that are spaced from each other to accommodate the wheel. These arms extend from the wheel mount at an angle θ, which in the arrangement shown, is about 45 degrees. The other ends of these arms are joined to elongated connectors 44a and 44b. The upper arms 40a and 40b are attached proximate the upper end of the connectors 44a and 44b,k respectively, and the lower arms 42a and 42b are fastened proximate the lower end of the connectors 44a and 44b, respectively. An upper transverse cross member 46 joins the upper end of the connectors 44a and 44b, while a lower transverse cross member 48 joins the lower end of connectors 44a and 44b.

The connectors 44a and 44b are pivotally mounted to the main frame 32 along a pivot axis 50. The pivot axis 50 is preferably located proximate the center of the connectors 44a and 44b such that the frame struts 45a and 45b generally hide the connectors 44a and 44b from view. The pivot axis 50 allows the swing arm 34 to pivot relative to the main frame 32. As seen in FIG. 2, the pivoting of the swing arm 34 allows the wheel axis 38 to move upwardly and downwardly within a range of motion Y. This range of motion Y is preferably about four inches.

Figure 3:
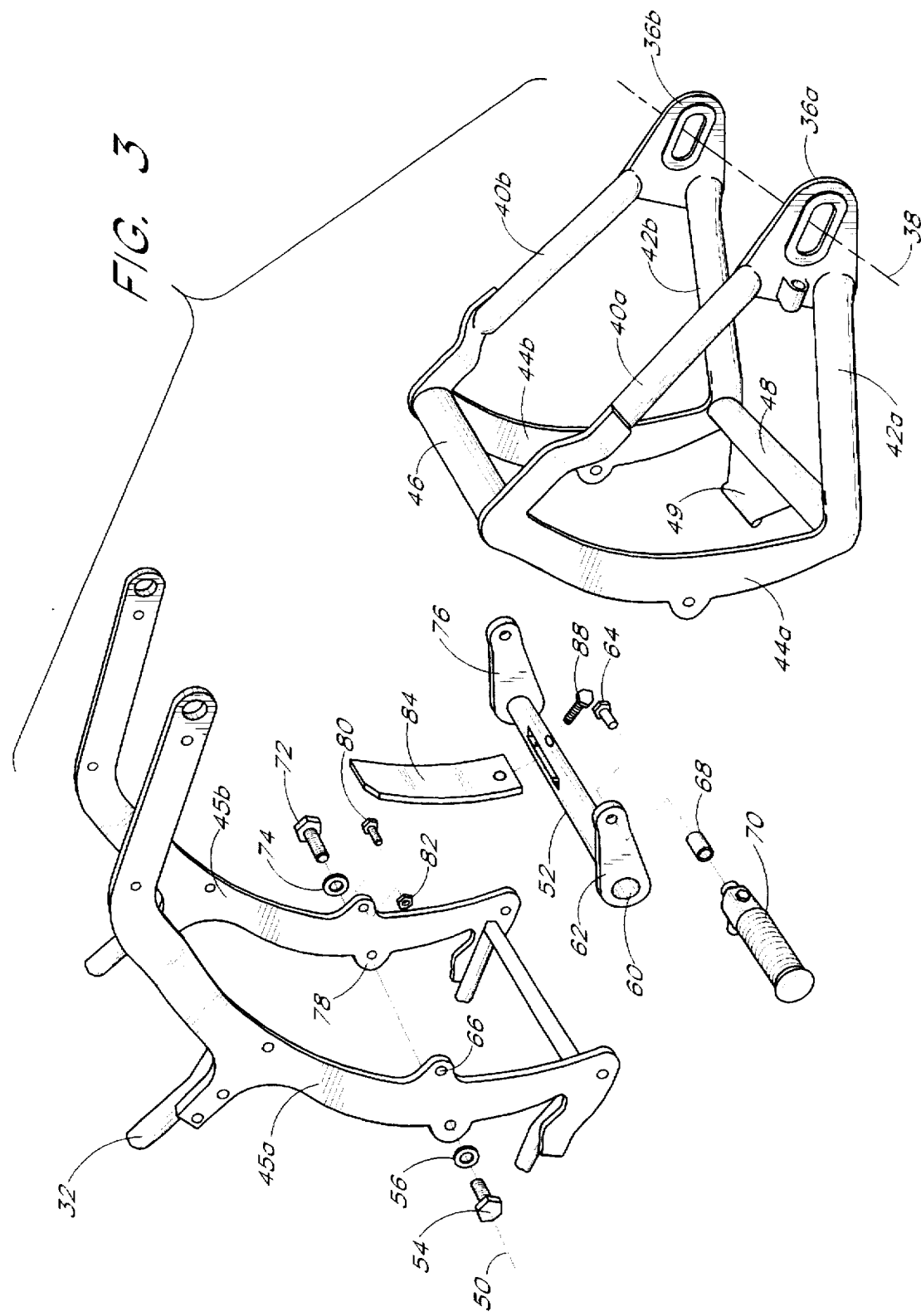
FIG. 3 is a side exploded view of the motorcycle suspension system of FIG. 2.

As seen in FIGS. 2 and 3, a shaft or axle 52 is mounted generally concentrically about the pivot axis 50. The shaft 52 preferably comprises a generally solid cylindrical shaft constructed from a material such as steel. The shaft 52 preferably has a diameter between approximately 1.0 and 2.0 inches, and more preferably about 1.5 inches. It will be understood that the shaft 52 may include a tube, bolt, or the like, and that the shaft 52 may have a square, rectangular, or other type of shape. Further, the shaft 52 may be constructed from a wide variety of known materials, such as plastics, synthetics, composites or the like.

As seen in FIG. 3, one end of the shaft 52 is preferably connected to the main frame 32 by a swing arm pivot bolt 54 which passes through a washer 56 and the frame strut 45a. The pivot bolt 54 is threaded into the end of the shaft 52. This end of the shaft 52 is connected to an opening 60 in one end of an arm 62. The arm 62 is preferably about four inches in length and the shaft 52 is preferably nonrotatably connected to the arm 62 by means such as engaging splines. More preferably, the shaft 52 is rigidly attached to the arm 62 by means such as welding. The other end of the arm 62 is attached to the frame strut 45a by a bolt 64 that is connected to a projection 66 extending rearwardly from the frame strut 45a. In particular, the bolt 64 passes through the arm 62, projection 66, sleeve 68, and is threadably connected to the foot peg 70. The foot peg 70 is often used as a foot rest for the motorcycle rider. The foot peg 70 is preferably pivotally mounted so that it can be pivoted upwardly and adjacent the frame strut 45a when not in use.

The other end of the shaft 52 is preferably connected to the frame strut 45b by a swing arm pivot bolt 72. The bolt 72 passes through a washer 74, the frame strut 45b and is threadably connected to this end of the shaft 52. This end of the shaft 52 is nonrotatably connected to an arm 76 by means, for example, such as engaging splines or more preferably by means such as welding. The other end of the arm 76 is connected to a rearwardly extending projection 78 of the frame strut 45b by a bolt 80 and nut 82. It will be understood that this connection of the arm 76 to the frame strut 45b may also be utilized to support a foot peg in a manner similar to that described above.

One end of an elongated leaf spring 84 is attached to the shaft 52 with the other end being free to flex in cantilever fashion. The leaf spring 84 is preferably constructed from steel, more preferably 5160 steel. The leaf spring 84 is generally about 10 inches in length and about 0.25 inches in thickness. The leaf spring 84 is also preferably between about 1.5 and about 2.5 inches in width, more preferably about 1.75 inches in width, and has a Rockwell C scale hardness between about 47 and about 54, more preferably about 50. One of ordinary skill in the art will recognize that the leaf spring 84 may be constructed from a variety of materials including metals, plastics, composites and the like. Further, the dimensions of the leaf spring 84 may vary according to factors such as the desired suspension characteristics and the type of material used.

Figure 5:
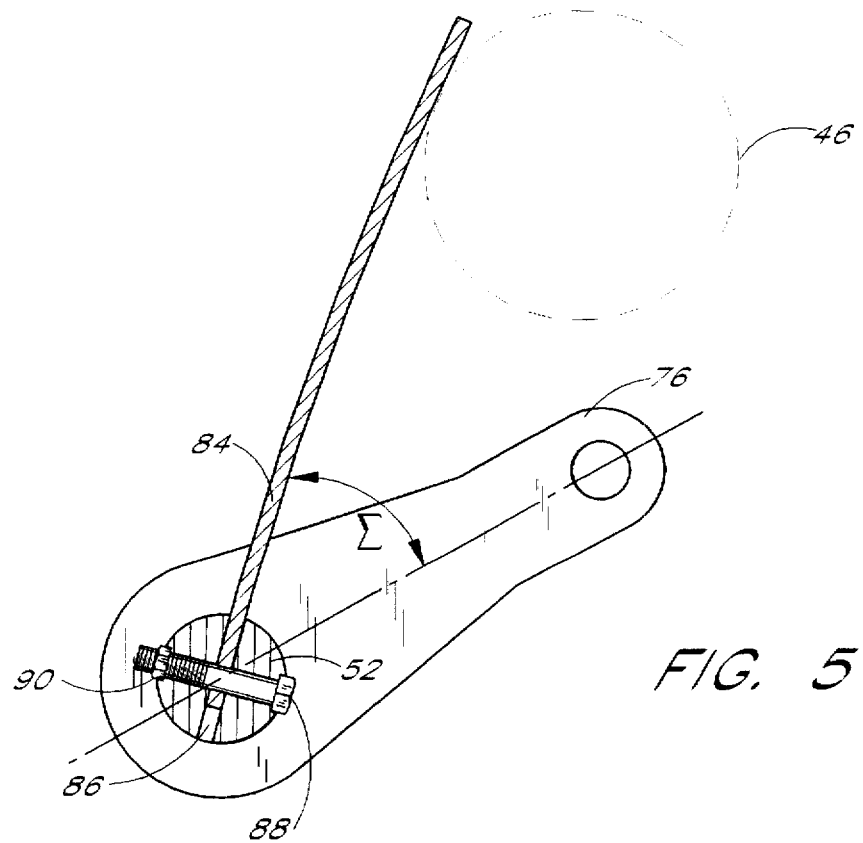
FIG. 5 is a cross section view along 5—5 of the motorcycle suspension system shown in FIG. 4.

The leaf spring 84 is preferably centrally located along the length of the shaft 52, but it will be understood that the leaf spring 84 may be attached anywhere along the length of the shaft 52. The leaf spring 84 is preferably rigidly attached to the shaft 52 to prevent movement of this end of the leaf spring 84 relative to the shaft 52. Most preferably, the leaf spring 84 is attached to the shaft 52 by inserting one end of the leaf spring 84 into a slot 86 which is sized slightly larger than the leaf spring 84. The leaf spring 84 is held within the slot 86 by a bolt 88 and a nut 90 as seen in FIG. 5. It will be understood that the leaf spring 84 and shaft 52 may be connected in any known manner including welding, fasteners, glue and the like.

As seen in FIG. 5, the slot 86 in the shaft 52 is preferably located at an angle v relative to a longitudinal axis C—C of the arm 76. The angle v between the slot 86 and the axis C—C of the arm 76 preferably extends generally upwardly between about 5 and about 30 degrees, and more preferably about 15 degrees. Because the longitudinal axis C—C of the arm 76 of a typical Harley-Davidson Softail suspension system extends generally upwardly about 10 to 15 degrees from horizontal when the arm 76 is attached to the motorcycle frame, the slot 86 extends generally upwardly between about 15 and about 45 degrees and more preferably about 25 degrees from horizontal. This allows one end of the leaf spring 84 to be inserted into the slot 86 and the other end of the leaf spring 84 engages the upper transverse cross member 46. It will be understood that different angles E of the slot 86 and shapes of the leaf spring 84 may be used to create the desired suspension system.

Figure 4:
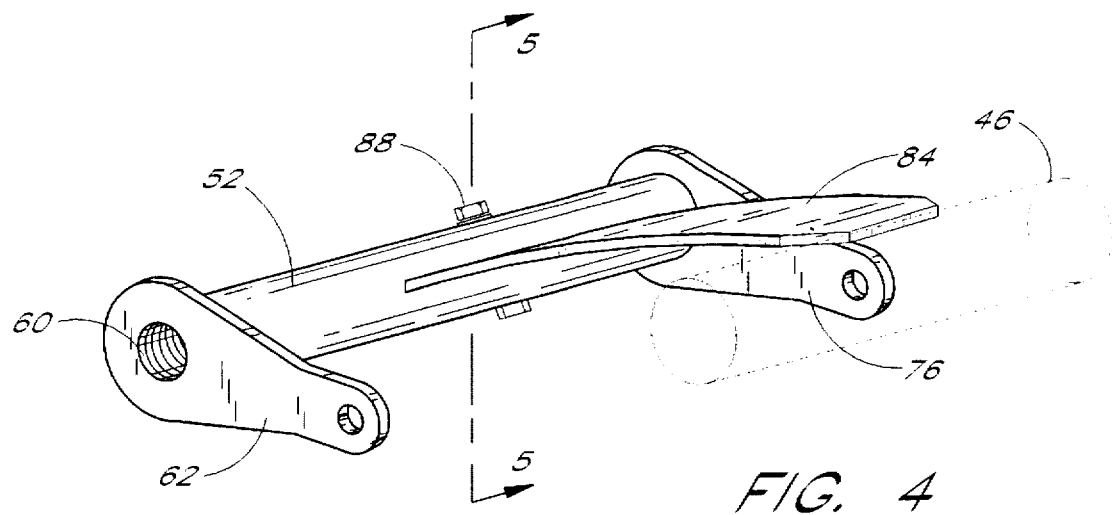
FIG. 4 is a side perspective view of the motorcycle suspension system shown in FIG. 2.

As best seen in FIGS. 4 and 5, the free end of the leaf spring 84 is configured to engage the upper transverse cross member 46 of the swing arm 34. This end of the leaf spring 84 preferably engages but is not rigidly attached to the upper transverse cross member 46. Alternatively, it will be appreciated that the leaf spring 84 may also be configured, to engage other portions of the swing arm 34 such as, for example, the lower transverse cross member 48 or the projection 49.

The leaf spring 84 is preferably configured to allow the swing arm 34 to pivot up to about at least 14 degrees with respect to the pivot axis 50. More preferably, the leaf spring 84 allows the swing arm 34 to pivot approximately 22 degrees with respect to the pivot axis 50. Additionally, the resistance provided by the leaf spring 84 is preferably selected so that when the motorcycle is preloaded, the wheel axis 38 is generally located proximate the middle of the range Y of wheel travel. Preferably, the range of wheel travel Y is about 4 inches so that the suspension system 30 allows the wheel to travel about 2 inches in either upward or downward directions.

As best seen in FIGS. 4 and 5, the leaf spring 84 preferably has a generally constant radius of curvature of about 1 inch of curvature for every 12 inches in length. It will also be understood that the radius of curvature of the leaf spring 84 may also vary along its length. For example, the leaf spring 84 may comprise a generally straight section and a generally curved section. It will be appreciated that different shapes may be utilized depending upon the desired suspension characteristics and design.

Most preferably, the leaf spring 84 is configured such that the leaf spring 84 and the circular cross section of the cross member 46 are engaged along a contact line that remains generally the same throughout the movement of the swing arm 34. That is, as the concave side of the swing arm 34 rotates about the pivot axis 50 and the cross member 46 pushes against the leaf spring 84, the leaf spring 84 begins to straighten and absorb the force of the rotating swing arm 34. The movement of the cross member 46 and the corresponding straightening of the leaf spring 84 are configured such that generally the same contact line between the cross member 46 and leaf spring 84 remain engaged. This reduces wear and friction in the suspension system 30 because there is no relative movement of the leaf spring 84 to the cross member 46. Additionally, because the leaf spring 84 does not wear out with general use, the need for periodic replacement is eliminated and the leaf spring 84 does not require any adjustment. Further, it will be understood that the leaf spring 84 may also be rigidly attached to the cross member 46.

Figure 6:
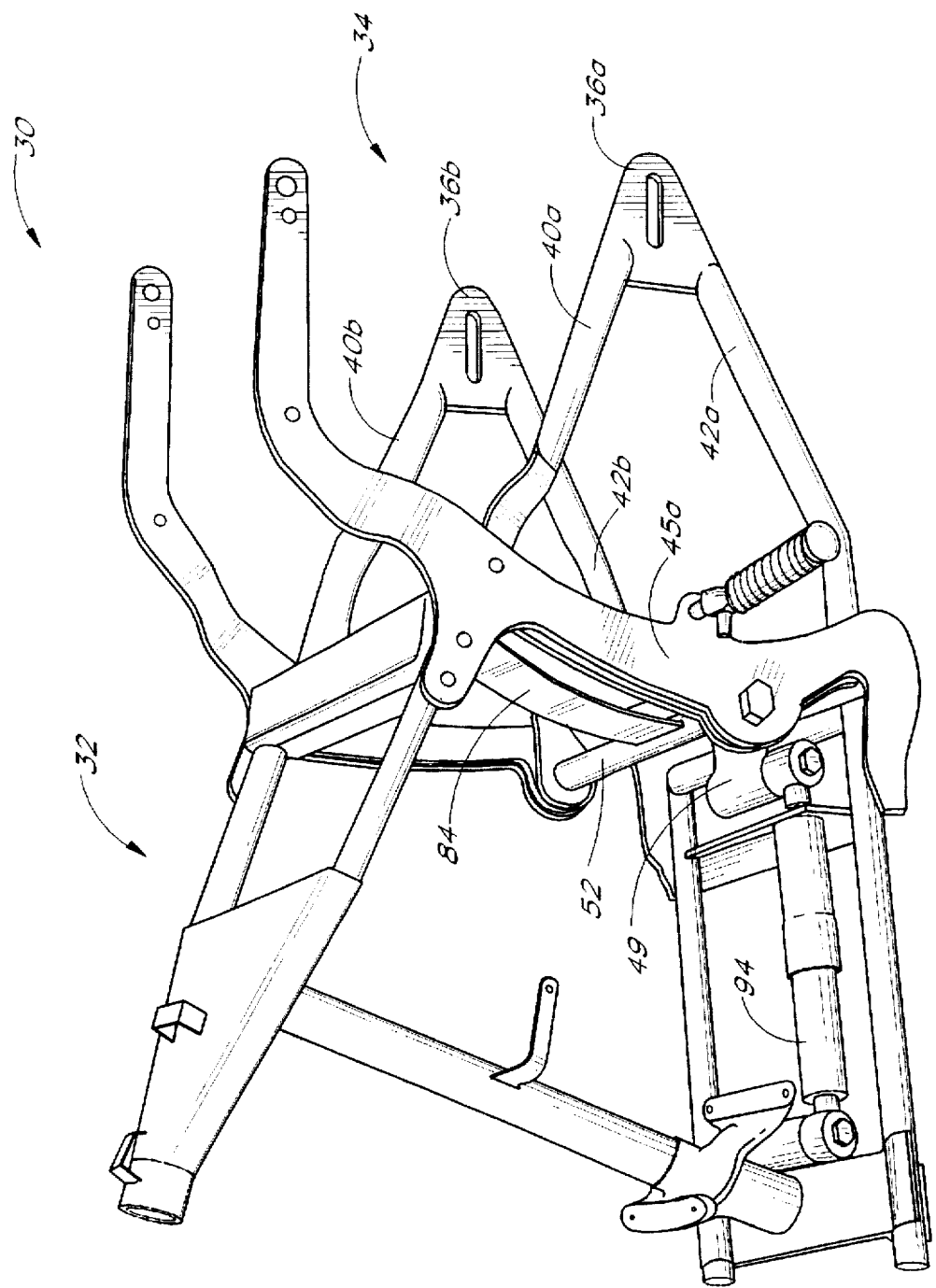
FIG. 6 is a side perspective view of another preferred embodiment of the motorcycle suspension system.

In another preferred embodiment shown in FIG. 6, the suspension system 30 includes a dampener 94. The dampener 94, however, is not a supporting member and is not required. One end of a suitable dampener 94 is attached to the forward end of the main frame 32. The other end of the dampener 94 is connected to the projection 49 extending forwardly from the lower transverse cross member 48. Preferably, the dampener 94 only dampens movement during rebound or while the swing arm 14 is returning to its original position. The dampener 94 may be obtained from a manufacturer such as Bilstein of Germany, which is distributed in San Diego, Calif. The dampener 94 is lighter in weight and smaller in size than the two shock absorbers used in the Harley-Davidson Softail suspension system. This decreases the weight of the motorcycle and leaves additional space for the installation of other components.

Figure 7:
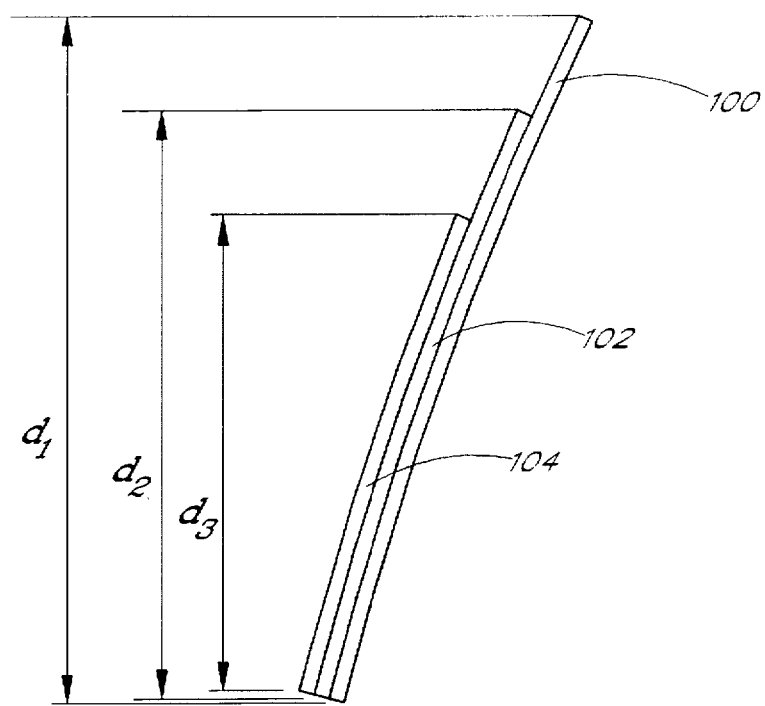
FIG. 7 is a side view of another preferred embodiment of the present invention illustrating multiple leaf springs.

In another preferred embodiment shown in FIG. 7, the suspension system 30 comprises three stacked leaf springs 100, 102, and 104. The outer end of the longer spring 100 is to engage the cross member 46. It will be understood that any number of leaf springs may be utilized to create the desired suspension characteristics. The three leaf springs 100, 102 and 104 allow the suspension system 30 to vary at progressively different rates because the leaf springs are different lengths. Preferably, the leaf spring 100 has a length $d_1$ between about 9 and 12 inches, and more preferably about 10½ inches; the leaf spring 102 has a length $d_2$ preferably between about 8 and 10 inches, and more preferably about 9 inches; and the leaf spring 104 has a length $d_3$ preferably between about 5 and 7 inches, and more preferably about 6 inches.

The leaf springs 100, 102 and 104 preferably move independently such that the suspension system 30 increases in resistance as the swing arm 34 nears its maximum amount of rotation relative to the main frame 32. The leaf springs 100, 102 and 104 are preferably constructed from 5160 steel, but it will be understood that a wide variety of types of steel, plastics, composites and the like may be utilized to construct the leaf springs. Additionally, the leaf springs 100, 102 and 104 preferably have a hardness on the Rockwell C scale between about 5150 and 5154, and more preferably about 5152. Further, the leaf springs 100, 102 and 104 preferably have a thickness of about 0.232 inches and are about 1.75 inches wide. One of ordinary skill in the art will understand that materials of different hardness and different dimensions may also be utilized depending upon factors such as the derived suspension characteristics.

Figure 8:
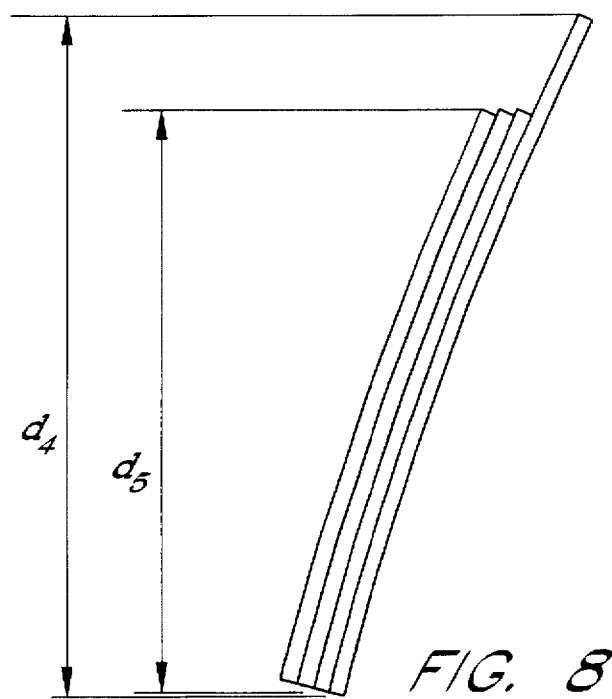
FIG. 8 is a side view of yet another preferred embodiment of the present invention illustrating multiple leaf springs.

Another preferred embodiment of a suspension system utilizing multiple leaf springs is shown in FIG. 8. The suspension system includes four stacked leaf springs 120, 122, 124 and 126. The leaf spring 120 preferably has a length $d_4$ of about 10 inches and the leaf springs 122, 124 and 126 preferably have a length $d_5$ which is about the same, preferably about 8.75 inches. The leaf springs 120, 122, 124, and 126 are preferably about 0.25 inches in thickness and about 1.75 inches in width. One end of the leaf spring stack is of course, to be fixed to the shaft 52, while the free end of the longer spring 120 is to engage the cross member 46.

Figure 9:
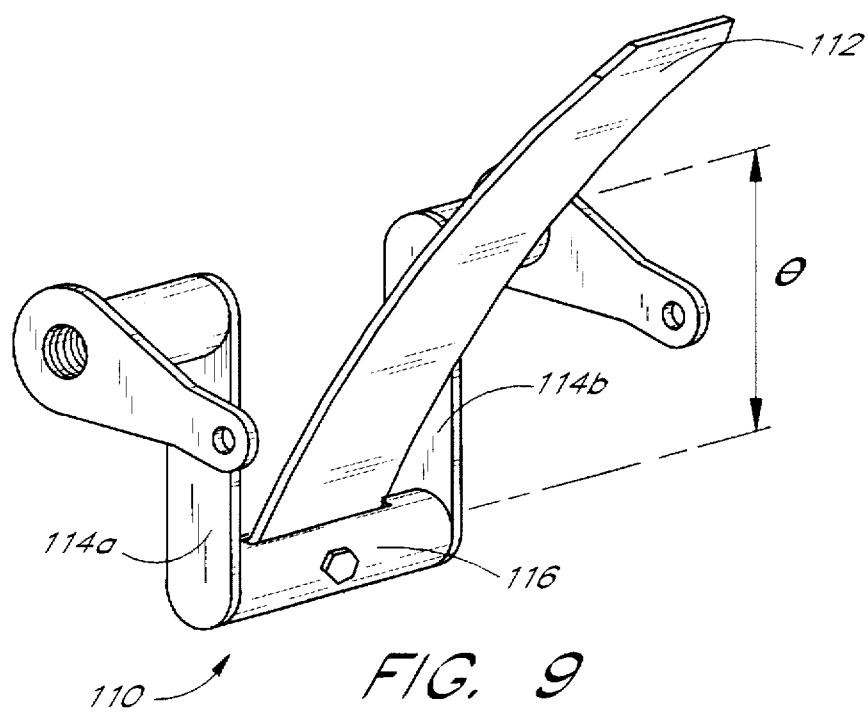
FIG. 9 is a side perspective view of another preferred embodiment of the present invention illustrating a U-shaped shaft.

FIG. 9 shows another preferred embodiment of the invention in which the shaft 52 has a U-shaped extension or offset section 110 to allow the length of the leaf spring 112 to be increased. Preferably, the extension 110 is about 4 inches in length such that the leaf spring 112 is also increased about 4 inches in length. It will be understood that the extension could vary in length from less than 1 inch to more than 6 inches, and the extension 110 can be configured to accommodate either a single or multiple leaf springs. The extension 110 preferably consists of two plates 114a and 114b joined by a shaft 116. The two plates 114a and 114b are preferably constructed of ⅜-inch steel plates and the shaft 116 is preferably a solid cylindrical tube containing a slot (not shown). The leaf spring 112 is preferably held within the slot by a bolt 118 in a manner similar to that described above.

Figure 10:
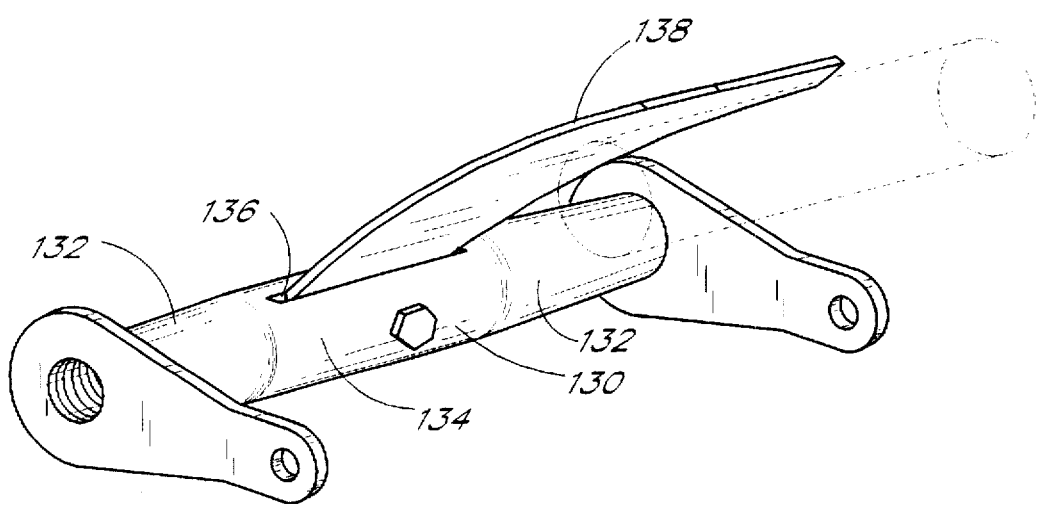
FIG. 10 is a side perspective view of still another preferred embodiment of the present invention illustrating a tapered shaft.

As shown in FIG. 10, in another preferred embodiment of the invention, the shaft 130 is tapered. The tapered shaft 130 preferably has a first section 132 proximate each end of the shaft, and these sections 132 preferably have a diameter of about 1.625 inches. The tapered shaft 130 expands to a second, enlarged section 134 proximate the center of the shaft 130. This second section 134 has a diameter of about 1.875 inches. The second section 134 is preferably centrally located about a slot 136 which is configured to receive one or more leaf springs 138. Preferably the shaft 130 gradually enlarges from the first sections 132 proximate the ends of the shaft 130 to the second section 134, but it will be understood that the shaft 130 may be configured in a variety of shapes such that the leaf spring 138 is securely supported. The enlarged section 134 compensates for the strength loss caused by the slot 136.

Although this invention has been described in terms of certain preferred embodiments, other embodiments apparent to those of ordinary skill in the art are also within the scope of this invention. Accordingly, the scope of the invention is intended to be defined only by the claims which follow.

I claim:

1. A suspension system for a motorcycle, comprising:
   a frame;
   a swing arm pivotally mounted to said frame on a pivot axis, said swing arm having a pair of wheel mounts located on a wheel axis spaced to receive a wheel, a pair of arms extending from each of said wheel mounts, a connector connecting each said pair of arms, each connector being joined to the other connector by an upper transverse cross member and a lower transverse cross member,
   a shaft extending along said pivot axis: and
   a leaf spring having a first end connected to said shaft and a second end configured to engage said swing arm in a manner such that pivoting movement of said swing arm is resiliently restrained by said spring, wherein said leaf spring engages said upper transverse cross member of said swing arm.

2. The suspension system of claim 1, wherein said leaf spring and said upper transverse cross member engage along a contact line that remains substantially the same throughout the travel of the swing arm.

3. The suspension system of claim 2, wherein said leaf spring is curved such that a concave side of said leaf spring engages said upper transverse cross member.

4. A suspension system for a motorcycle comprising:

a frame, a swing arm pivotally mounted to said frame on a Divot axis, said swing arm having a pair of wheel mounts located on a wheel axis spaced to receive a wheel, a pair of arms extending from each of said wheel mounts, a connector connecting each said pair of arms, each connector being Joined to the other connector by an upper transverse cross member and a lower transverse cross member;

a shaft extending along said pivot axis; and a leaf spring having a first end connected to said shaft and a second end configured to engage said swing arm in a manner such that pivoting movement of said swing arm is resiliently restrained by said spring, wherein said shaft has an enlarged section located between opposing ends of said shaft.

5. A suspension system for a motorcycle, comprising:

a frame having spaced, parallel first and second struts;

a swing arm pivotally mounted to said frame on a pivot axis that extends through said struts, said swing arm having first and second wheel mounts located on a wheel axis spaced to receive a wheel, a first pair of arms extending from said first wheel mount, a second pair of arms extending from said second wheel mount, said first pair of arms attaching to a first connector, said second pair of arms attaching to a second connector, an upper transverse cross member and a lower transverse cross member joining said first connector to said second connector, said first connector being pivotally mounted adjacent said first strut along said pivot axis, said second connector being pivotally mounted adjacent said second strut along said pivot axis;

a shaft extending along said pivot axis, said shaft having a first end with an internally threaded portion, a first swing arm pivot bolt located along said pivot axis and passing through said first strut and said first connector and being threaded into said threaded portion of said shaft, said shaft having a second end with an internally threaded portion, a second swing arm pivot bolt located along said pivot axis and passing through said second strut and said second connector and being threaded into said threaded portion of said shaft;

a first short arm having two ends, one end connected to said first end of said shaft and the other end connected to said frame;

a second short arm having two ends, one end connected to said second end of said shaft and the other end connected to said frame; and a leaf spring connecting to said shaft and said upper transverse member cross member in a manner to dampen movement of said swing arm.

* * * * *